US007702117B2

(12) United States Patent
Crocitti et al.

(10) Patent No.: US 7,702,117 B2
(45) Date of Patent: Apr. 20, 2010

(54) METHOD FOR SOUND ADJUSTMENT OF A PLURALITY OF AUDIO SOURCES AND ADJUSTING DEVICE

(75) Inventors: Valérie Crocitti, Saint Armel (FR); Pierre Houeix, Cesson Sévigné (FR); Willem Lubbers, Cesson-Sévigné (FR)

(73) Assignee: Thomson Licensing, Boulogne Billancourt (FR)

( * ) Notice: Subject to any disclaimer, the term of this patent is extended or adjusted under 35 U.S.C. 154(b) by 1920 days.

(21) Appl. No.: 10/398,345

(22) PCT Filed: Oct. 2, 2001

(86) PCT No.: PCT/FR01/03039

§ 371 (c)(1),
(2), (4) Date: Apr. 4, 2003

(87) PCT Pub. No.: WO02/30113

PCT Pub. Date: Apr. 11, 2002

(65) Prior Publication Data

US 2004/0013277 A1    Jan. 22, 2004

(30) Foreign Application Priority Data

Oct. 4, 2000    (FR) .................................. 00 12643

(51) Int. Cl.
*H03G 7/00*    (2006.01)
(52) U.S. Cl. ......................... 381/109; 381/119; 381/104
(58) Field of Classification Search ............. 381/61–62, 381/119, 104–105, 109, 107, 118; 463/30–32, 463/34, 37, 40
See application file for complete search history.

(56) References Cited

U.S. PATENT DOCUMENTS

| 5,715,318 | A |   | 2/1998  | Hill et al. ....................... 381/24  |
| 5,795,228 | A | * | 8/1998  | Trumbull et al. .............. 463/42 |
| 6,040,831 | A |   | 3/2000  | Nishida ...................... 345/340 |
| 6,241,609 | B1 | * | 6/2001  | Rutgers ....................... 463/31 |
| 6,459,797 | B1 | * | 10/2002 | Ashour et al. ................. 381/18 |
| 6,490,358 | B1 | * | 12/2002 | Geer et al. .................. 380/286 |
| 6,490,359 | B1 | * | 12/2002 | Gibson ....................... 381/119 |

(Continued)

FOREIGN PATENT DOCUMENTS

JP    8-87397 A    4/1996

(Continued)

*Primary Examiner*—Xu Mei
*Assistant Examiner*—Disler Paul
(74) *Attorney, Agent, or Firm*—Robert D. Shedd; Robert B. Levy; Jorge Tony Villabon

(57) ABSTRACT

The present invention relates to a method of adjusting the sound levels originating from several audio sources, within a television receiver. The audio components originating from at least two audiovisual or audio sources are received in an audiovisual receiver and mixed so as to generate a single audio signal. The levels assigned to each source can be adjusted by the user with the aid of an icon displayed on a screen. The icon comprises at least two points representing the two sources and a cursor which moves along two dimensions, the distance between this cursor and the point representing a source being proportional to the sound level assigned to this source. The present invention also relates to the audiovisual terminal for the implementation of the method.

16 Claims, 6 Drawing Sheets

U.S. PATENT DOCUMENTS

| | | | |
|---|---|---|---|
| 6,507,658 B1 * | 1/2003 | Abel et al. | 381/17 |
| 6,525,746 B1 * | 2/2003 | Lau et al. | 715/725 |
| 6,798,889 B1 * | 9/2004 | Dicker et al. | 381/303 |
| 6,826,282 B1 * | 11/2004 | Pachet et al. | 381/61 |
| 6,829,018 B2 * | 12/2004 | Lin et al. | 348/738 |
| 6,977,653 B1 * | 12/2005 | Cleary et al. | 345/440 |

FOREIGN PATENT DOCUMENTS

| | | |
|---|---|---|
| JP | 08087397 | 4/1996 |
| JP | 2000069391 | 3/2000 |
| JP | 2000-69391 A | 3/2003 |
| WO | 99/34280 | 7/1999 |

\* cited by examiner

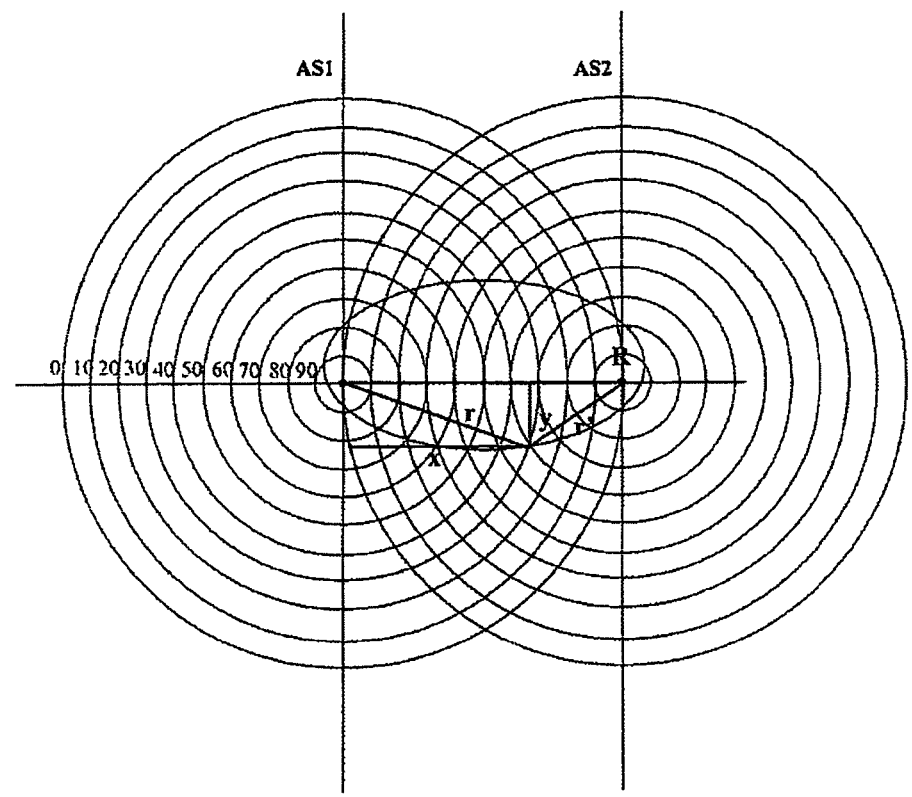
Fig. 5
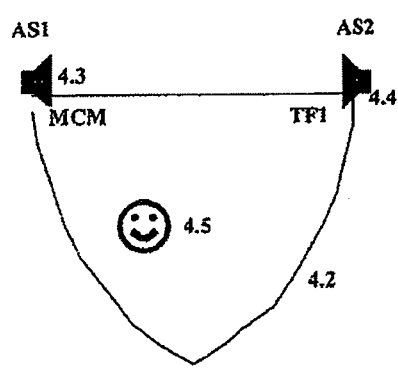
Fig.7

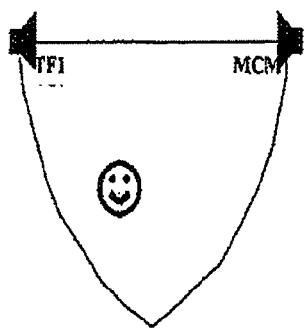
Fig.8
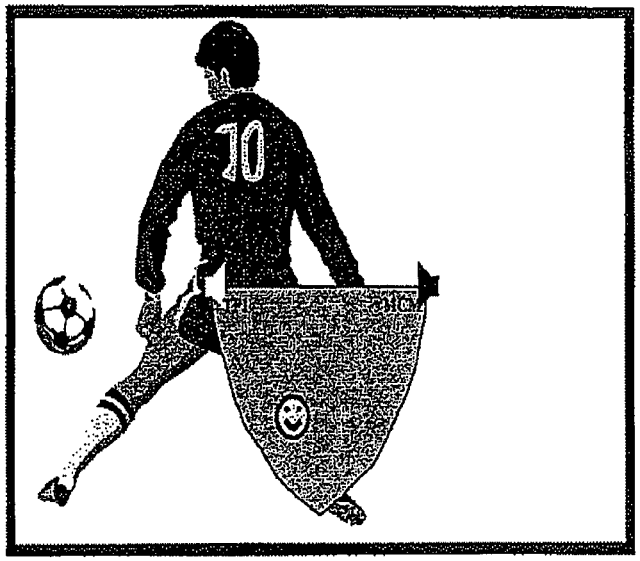
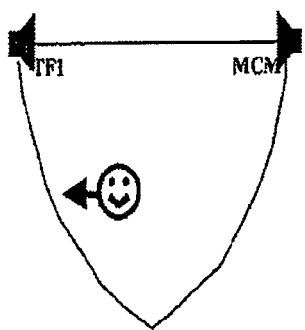
Fig.9

METHOD FOR SOUND ADJUSTMENT OF A PLURALITY OF AUDIO SOURCES AND ADJUSTING DEVICE

This application claims the benefit under 35 U.S.C. §365 of International Application PCT/FR01/03039 filed Oct. 2, 2001, which claims the benefit of French Application No. 00/12643, filed Oct. 4, 2000.

FIELD OF THE INVENTION

The invention relates to a method of processing audio data intended to be heard on a television receiver. The invention applies more particularly to the selection and to the adjustments of the levels of sound signals emitted by audio sources and received in a television receiver. The invention also relates to a graphical element making it possible to adjust several levels of one and the same physical quantity.

BACKGROUND

The context of the present invention is that of receivers of audiovisual transmissions, for example digital television receivers. In this context, a broadcaster transmits audiovisual signals corresponding to audiovisual transmissions that users can see and listen to on their receivers. Within the field of digital television, the network broadcasts audiovisual transmissions more commonly referred to as "events", as well as data intended to reference them. These data are defined in the DVB-SI specifications ("Digital Video Broadcast-specification for Service Information") EN 300 468 V1.3.1 (published by the ETSI). They take the form of tables and descriptors which describe the objects transmitted on the broadcasting network. A service is an uninterrupted string of events broadcast on a specified stream.

The DVB-SI standard defines in particular the format of tables such as: NIT, SDT, EIT and possibly BAT. The NIT table gives the general structure of the network and indicates the list of transport streams and of services broadcast. The SDT table gives additional information relating to the services, for example the plaintext name of a service. The EIT table indicates a list of events for each service, and in particular the events currently being broadcast. The BAT table contains information about several services grouped together into a package, these services may arise from several broadcasting networks.

With the aid of the data contained in these tables, the receiver knows the general content of the audiovisual events broadcast by the network. The data transmitted on a service can be of audiovisual or just audio nature.

The existing systems do not make it possible to hear several audio sources at one and the same time. Thus, it is not possible during the showing of an event to simultaneously hear the sound belonging to this service and background music broadcast by another service, these two audio contents being chosen independently of one another by the user. The present invention aims to solve this problem and affords the user high listening comfort during the showing of events originating from a broadcasting network.

SUMMARY OF THE INVENTION

The aim of the invention is a method of adjustment in an audiovisual receiver of levels of sound signals originating from a plurality of sources, comprising:

a step of selecting at least two audio or audiovisual sources,
a step of displaying on a screen an icon comprising at least two points representing the two sources and a cursor,
a step of mixing the sound signals while assigning them a specified sound level,
characterized in that it comprises a step of adjusting the sound levels being performed independently for each source by a movement of the cursor along at least two dimensions, the distance between this cursor and the point representing a source being proportional to the sound level assigned to this source.

With the aid of the present invention, the sound listened to by the user results from the mixing of several audio sources received through a broadcasting network, the level of each source being adjustable. Thus, the user can mix the sound of an event transmitted through the broadcasting network with the sound originating from another service broadcast by this same network. This other service can be audio only. The sound levels can easily be shown through the position of a cursor within an icon. The distance between the cursor and the point representing a source being representative of the sound level assigned to this source.

According to another improvement, the user can, with the aid of buttons on a remote control, move the cursor in the icon, thus modifying the sound levels applied to each source. If in the course of its movement, the cursor reaches the outline of the icon, the cursor then slides around the outline in the direction closest to that corresponding to the button depressed.

According to another improvement, the adjustment icon makes it possible to adjust the levels originating from three sources. They then exhibit either a plane appearance making it possible to successively adjust pairs of sound levels, or a three-dimensional appearance, additional direction buttons then making it possible to move the cursor in the space delimited by the icon.

According to another improvement, the adjustment icon comprises an outline and a surface. The outline comprises points each representing sources, and curved lines having the said points as focus.

According to a particular embodiment, the surface of the icon is coloured by a particular colour in immediate proximity to the corners representing sources, and exhibits a gradation obtained by mixing of the colours as one moves away from these corners.

The present invention also relates to an audiovisual receiver comprising a means of receiving at least two audiovisual sources, means of transmitting the audio signals received, a means of selecting audio or audiovisual sources, a circuit for mixing the audio signals received from the selected sources, a means of displaying an icon comprising at least two points representing the two sources and a cursor, characterized in that it furthermore comprises a means of entering user commands so as to move the cursor along at least two dimensions, the distance between this cursor and the point representing a source is proportional to the sound level assigned to this source.

According to particular embodiments, the television receiver is designed to implement the above-listed improvements of the method.

BRIEF DESCRIPTION OF THE DRAWINGS

Other characteristics and advantages of the present invention will emerge from the description of the exemplary embodiments which follow, taken by way of nonlimiting examples, with reference to the appended figures in which:

FIG. 5 is a graph illustrating the mathematical relation which links the sound levels and the position of a visual indication in the icon;

FIG. 7 depicts a screen view comprising the audio adjustment icon;

FIG. 8 depicts a screen view comprising the audio adjustment icon after an exchange of the audio and video sources;

FIG. 9 depicts a screen view comprising the adjustment icon and the image of a first audiovisual service;

DETAILED DESCRIPTION

Figure 1:
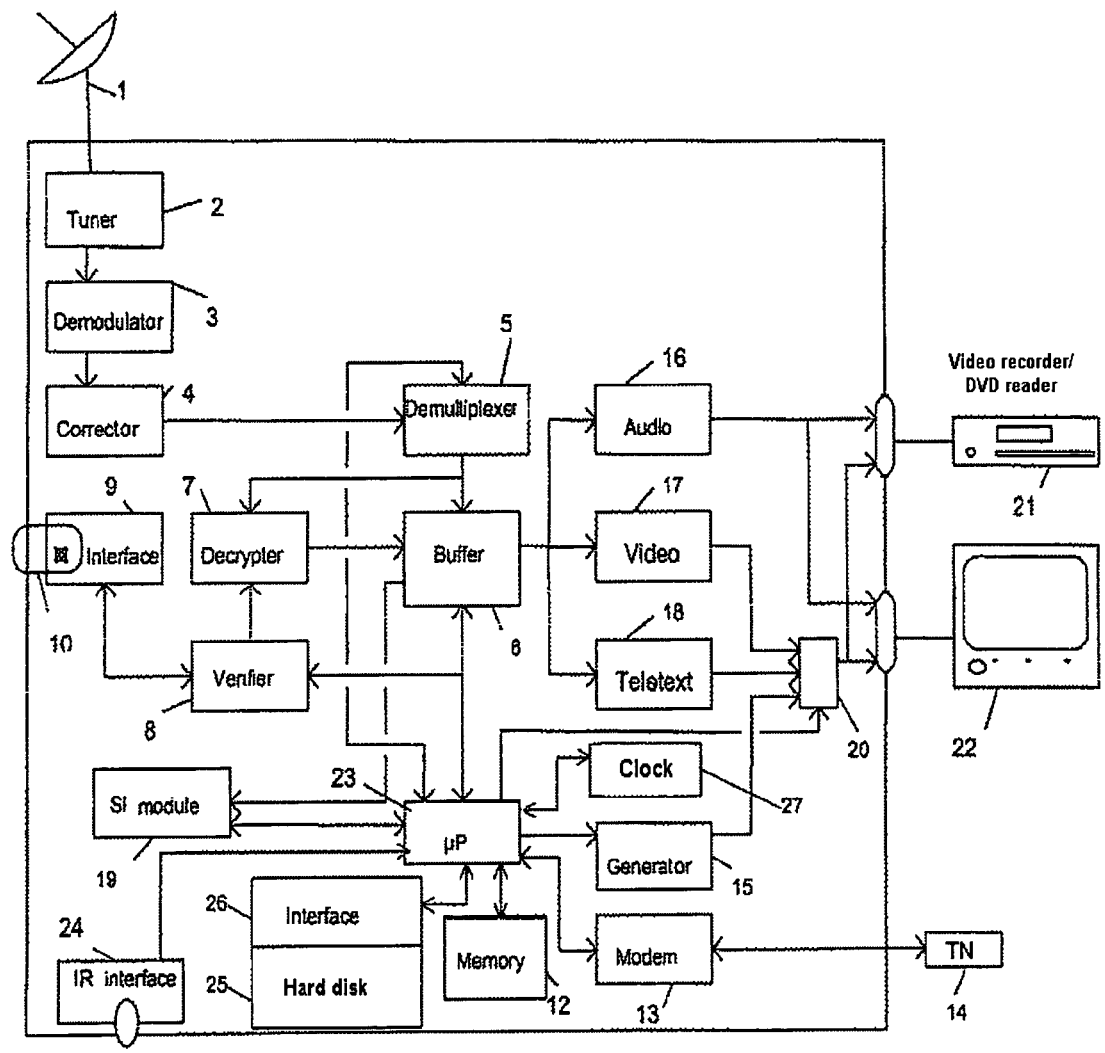
FIG. 1 represents a generic diagram of a television receiver.

A standard television receiver is described in FIG. 1. The receiver is, for example, a decoder in accordance with the DVB specifications. It uses an ISO/IEC 13818-1 transport layer.

The receiver is linked to an antenna 1, itself linked to a tuner of the decoder. The signal provided by the tuner is demodulated by a demodulator 3. The demodulated data are deinterlaced and corrected by an error corrector circuit 4 and transmitted to a demultiplexer 5. The latter comprises a certain number of filters programmed by a microprocessor 23 as a function of the various applications supported by the receiver. The microprocessor 23 is connected to a memory 12 comprising the operating system as well as the resident or downloaded programs for implementing applications. The ROM read-only memory contains among other things the basic program of the decoder. This program comprises input/output management routines such as: programming of the demultiplexer, reception of the commands issued by the remote control, showing of video sequences recorded in memory and specified by a pointer, etc.

A character generator 15 allows the generation of control or graphics menus relating to the parameters of the receiver or to a particular application. The video signals generated are multiplexed with one of the video signals originating from the video decoder 17 to a SCART socket linked to a television screen 22. The multiplexing circuit 20 is managed by the microprocessor 23. The audio and video signals are transmitted to the television screen and to peripheral appliances such as a video recorder, a hi-fi, loudspeakers, etc. The receiver is also equipped with a remote control 11, linked to the microprocessor by an infrared link 24. This remote control has among other things navigation buttons (←, →, ↑, ↓, ↖, ↗, ↙, ↘), and control buttons whose role will be detailed later. The remote control can also have a joystick allowing the movement of a cursor over a plane. For the clarity of the diagram of FIG. 1, only the most important connections of the microprocessor 23 are illustrated.

The data packets or sections containing the audio and audiovisual transmissions are filtered by the demultiplexer, and are stored in predefined areas of a buffer memory 6.

Figure 2:
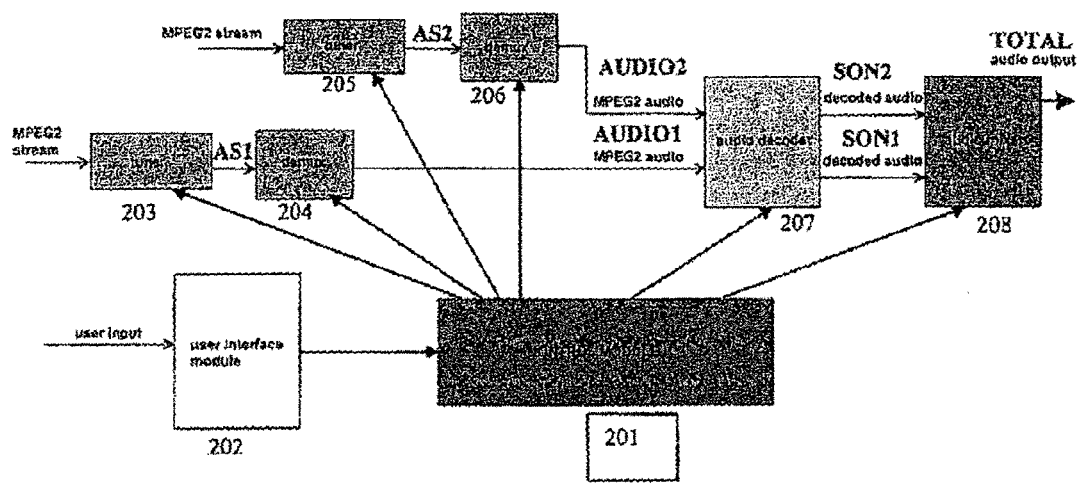
FIG. 2 represents a functional schematic of the television receiver for the implementation of the invention.

FIG. 2 depicts a functional schematic of the receiver according to an exemplary embodiment. The main elements are represented. Once again there is the microprocessor 23 which controls the various elements of the receiver, it receives from the user interface 202 the commands that the user formulates on the remote control or on the front panel of the receiver. As compared with the standard diagram of FIG. 1, the receiver is furnished with two means of data stream acquisition. One arrangement consists in furnishing the receiver with two tuners, 203, 205 and with two demultiplexers 204, 206. Thus, the receiver receives a first audiovisual data stream TS from a first reception means 203, 204 and a second audiovisual data stream TS from a second reception means 205, 206. The two demultiplexers make it possible to extract the audio components AUDIO1 and AUDIO2 respectively from the two streams. This extraction is performed by filtering the data packets. The two audio streams are then decoded in an audio decoder 207 which transforms the digital data packets into two analogue signals SOUND1 and SOUND2. The two analogue signals are mixed in the mixing cell 208 so as to provide a single audio signal SOUND. The so-called "total" SOUND signal is the resultant of the addition of the signals SOUND1 and SOUND2 such that:

$$SOUND = (a \times SOUND1) + (b \times SOUND2)$$

The parameters a and b make it possible to adjust the sound level of the respective signals SOUND1 and SOUND2. Their values vary for example from 0 to 100.

We shall now describe how the various elements of the invention, and in particular the various menus which appear on the screen and which allow the user to adjust the levels of the audio sources, cooperate.

Figure 3:
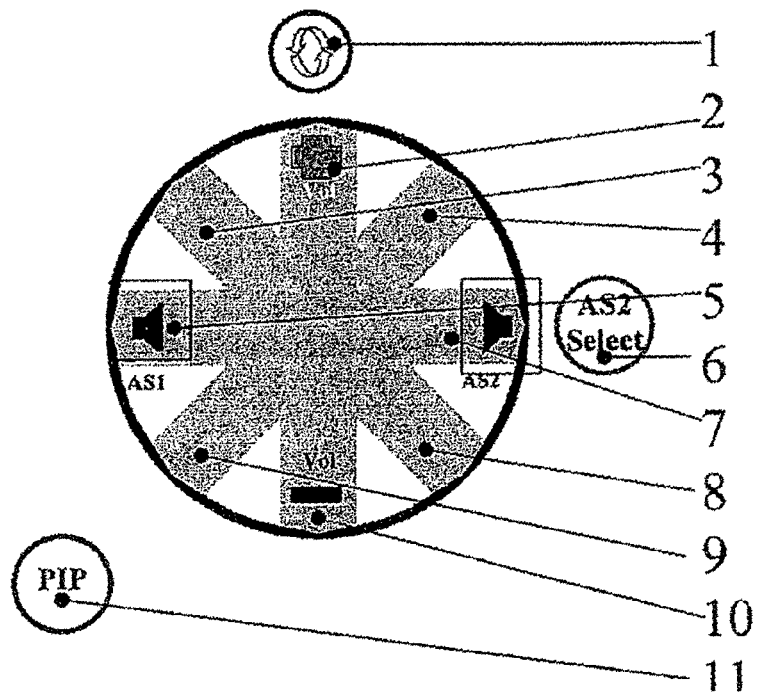
FIG. 3 depicts an exemplary remote control for controlling the various parameters.

Initially, the user selects a first audiovisual service with the aid of an Electronic Programme Guide for example. This programme utilizes the data extracted from the EIT tables to compile the list of available events. FIG. 3 depicts an exemplary remote control allowing a user to adjust the audio levels originating from the various audio sources (or AS for short) which the receiver can receive. Subsequently, the user selects a second audiovisual source. The first audio source is denoted AS1, and the second source AS2. This remote control takes the form of a keypad with eight direction buttons and three control buttons arranged in a circle around a central point. In the example, the direction buttons have the shape of angular sectors with the same centre. The three control buttons are: "EXCH" (represented in FIG. 3 by a circle containing two interleaved arrows) (1), "AS2 Select" (6) and "PIP" (11).

The buttons 2, 3, 4, 5, 7, 8, 9 and 10 allow the user to simultaneously adjust the total sound intensity and the relative intensities of the sound signals originating from the two services. Here are the functions of each of the buttons:

Button 2: ↑ increase the level of the total volume,

Button 3: ↖: increase the level of the total volume by increasing the volume of AS1, Button 4: ↗: increase the level of the total volume by increasing the volume of AS2, Button 5: ←: increase the volume of AS1 without increasing the level of the total volume, Button 7: →: increase the volume of AS2 without increasing the level of the total volume, Button 8: ↙: decrease the level of the total volume by decreasing the volume of AS2, Button 9: 🔽: decrease the level of the total volume by decreasing the volume of AS1, Button 10: ⬇: decrease the level of the total volume.

To demonstrate the influence of each button on the sound levels of each source, that is to say on the parameters a and b mentioned previously, we shall now take a numerical example.

At the outset, the sound levels have the value: AS1=30, AS2=30, the total level therefore has the value ToT=60. Ten presses of the ⬆ button cause an increase of 10 units of the two sound sources: AS1=40, AS2=40 and Tot=80. Ten presses of the ⬅ button cause an increase in the source AS1 and a decrease in AS2: AS1=50, AS2=30, the total level remains constant: Tot=80. Ten presses of the 🔼 button cause an increase in the source AS1: Lev. AS1=60, AS2=30, Tot=90. Finally, ten presses of the 🔽 button cause a decrease in the source AS1: AS1=60, AS2=20, Tot=80.

Figure 4:
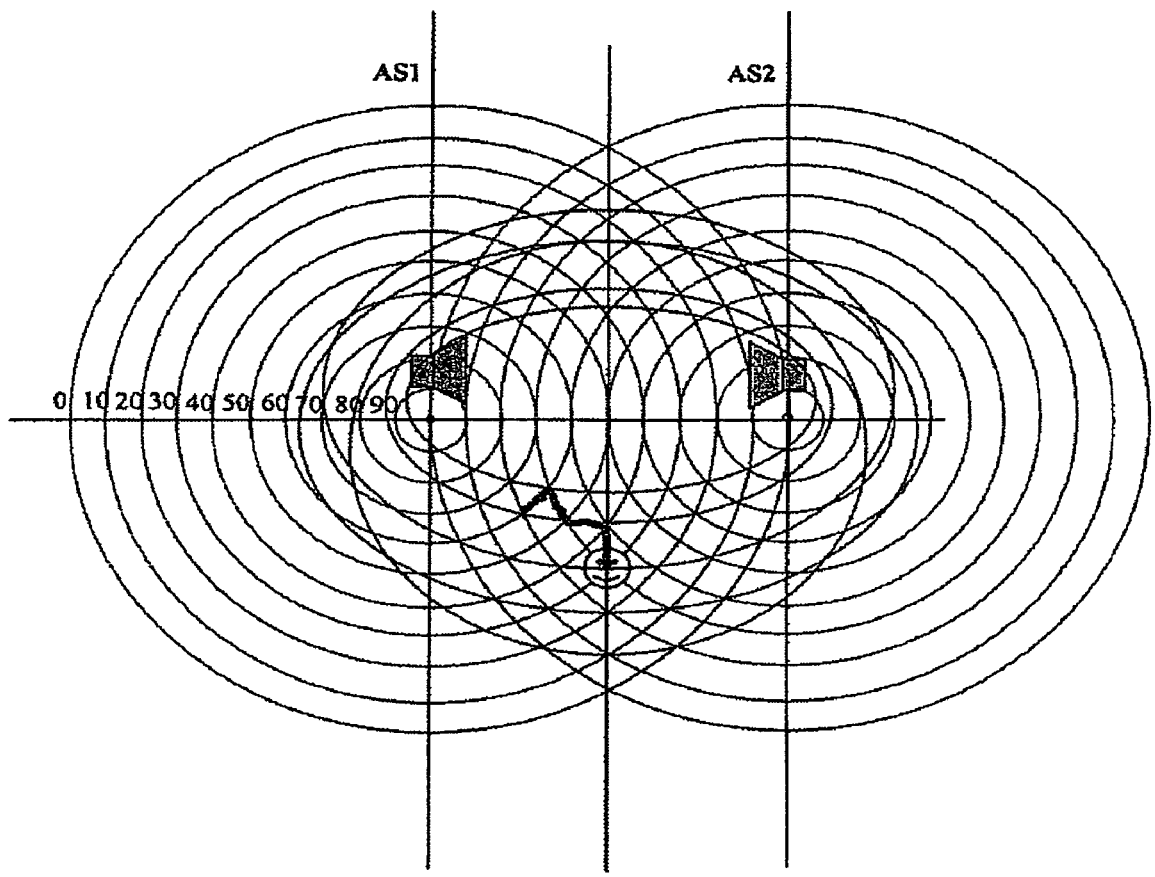
FIG. 4 represents the variations in sound level transmitted by two audio sources in a space.

FIG. 4 depicts the spatial representation of the sound emitted by two audio sources. Ten circles surround each of the audio sources, the further one moves away from the sources, the more the level (and hence the power) of the sound decreases: 100, 90, ... 20, 10, 0. The ovals represent constant values of the sum of the two levels. This spatial representation is reproduced on the screen in the form of a so-called "audio adjustment" icon whose plot is represented by the three bold curves in FIG. 4. The manner in which the adjustment is made is indicated intuitively to the user by the shape of the icon. Thus, the audio adjustment icon consists of a surface delimited by two arcs of circles disposed about a vertical axis of symmetry. The two arcs meet to form a downward directed point surmounted by a straight line joining the two arcs of a circle at two points of intersection or corners, one on the left the other on the right. These two points represent the audio sources AS1 (on the left) and AS2 (on the right). The left arc of a circle which meets AS1 represents the line of minimum sound adjustment for AS2. The right arc of a circle which meets AS2 is the line of minimum sound adjustment for AS1. The sound adjustments are represented graphically by the position of a visual indication moving over the surface of the icon. According to the example provided by the figures, this visual indication is represented by a small completely round face. The surface of the icon is big enough to represent all the possible adjustments, in this way the visual indication does not need to depart from the icon. Thus, the entire surface of the screen outside the icon can be devoted to the showing of the audiovisual transmissions. Represented in FIG. 4 is the movement of the small face which corresponds to the four series of presses which were described above.

FIG. 5 depicts the mathematical relation which links the sound levels and the position of the small face in the icon. To determine the sound level corresponding to a given point of the figure whose coordinates (x, y) are known, the following formulae are applied:

i.e.: $i1=(R-r)$ where $r=\sqrt{(x^2+y^2)}$ $i2=(R-r')$ where $r'=\sqrt{[(R-x)^2+y^2]}$ with R=100

Figure 6:
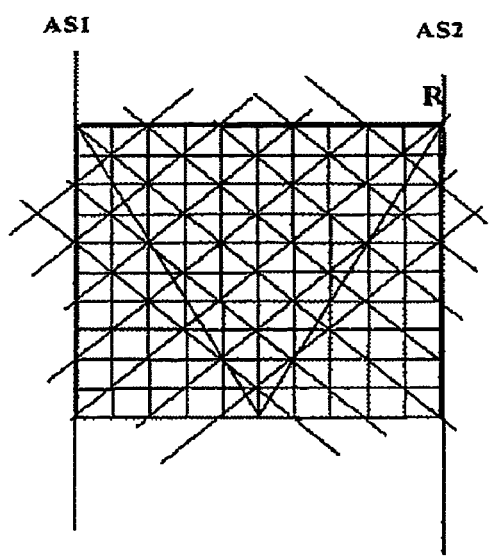
FIG. 6 depicts a variant embodiment of the adjustment icon.

"i1" and "i2" are in fact the percentages of the volume corresponding to the sources AS1 and AS2. It can be seen in FIG. 5 that the movement for a constant total volume (using the ➡ and ⬅ buttons) causes a movement over an ellipse ((r+r') constant). It is recalled that the action of these buttons does not change the level of the total volume, and hence intuitively the user ought to see a perfectly horizontal movement. A variant embodiment consists in the movement of the small face triggered by these buttons being perfectly horizontal. In this case, the mathematical relations are no longer the same and the shape of the icon must be modified. A representation of the icon according to this variant is indicated in FIG. 6: the edges of the icon form an equilateral triangle.

Let us now return to the exemplary remote control illustrated by FIG. 3 and let us explain certain commands. To select another audio source AS2, the user presses on the button (AS1 Select). A programme guide (the same as that used to select AS1) is then run to allow him to make his selection. The central unit configures the two reception means 203, 204 and 205, 206 so as to acquire the data streams AUDIO1 and AUDIO2 respectively. The receiver displays in a predominant manner the video data of the first audiovisual service selected and mixes the audio signals originating from the two services. Pressing the "PIP" button allows the inset display of the visual content associated with the second service. Pressing the "EXCH" button makes it possible to exchange the selected services. In fact, this command exchanges the predominance between the two services. For example, if the user has selected two audiovisual services, a first MCM (AS1) and a second TF1 (AS2), and if the sound levels are "30" for MCM and "10" for TF1, then pressing the "EXCH" button brings up the image broadcast by TF1 (and the image of MCM is inset if PIP was active), and the levels of the sound become 30 for TF1 and 10 for MCM. In this way, by pressing a single button, the user can switch to the service which especially attracts his attention. FIGS. 7 and 8 depict two exemplary screen views which are shown when the user presses the "EXCH" button.

If one of the services selected is audio only, it contains no video components. Such is the case for example with a radio service. The receiver then displays the name of this audio service.

At any moment during the showing of the event, the user can change the adjustment of the level of the audio sources. To do this, an indication of the sound adjustments appears immediately after the first press of one of the buttons of FIG. 3, indicating graphically the apportioning of the various sound levels. The icon disappears from the screen soon after the user ceases operating the buttons of the remote control. FIG. 7 depicts a screen view according to a preferred embodiment. The screen shows in the background the image 4.1 broadcast by the first service. The audio adjustment icon 4.2 is inlaid in the middle of the screen at the bottom. It is depicted enlarged in the left part of FIGS. 7, 8, 9 and 11. The names of the two services selected are indicated near the corners. In the example of FIG. 7, for AS1 the user has selected the service called "MCM", this name is marked near the left corner 4.3, and for AS2 he has selected "TF1" which is marked near the right corner 4.4.

The value of the sound adjustments is represented by the position in the icon of the small face 4.5 moving like a cursor. As was explained above, the closer the small face gets to the left corner 4.3, the more the sound level of the source AS1 (MCM) increases. The closer the small face gets to the right corner 4.4, the more the sound level of the source AS2 increases. If the small face is situated exactly midway between the two corners, the sound levels of each audio source are equal. The more the cursor descends, the lower the total level resulting from the mixing. If the cursor is placed on the corner 4.3, the level is a maximum for AS1 and 0 for AS2. If the cursor is placed on the corner 4.4, the level is a maximum for AS2 and 0 for AS1. If the cursor slides downwards along the left arc (respectively right arc), the level assigned to AS2 (respectively AS1) remains zero and that of AS1 (respectively AS2) decreases.

The user moves the face over the surface delimited by the icon 4.2 with the aid of the buttons (←, →, ↑, ↓, ↖, ↗, ↙, ↘) described earlier. A variant consists in the remote control having a joystick dedicated to the adjusting of the sound levels. The joystick allows the cursor to be moved in the same directions as the buttons. In all cases, the modification of the sound levels is immediately audible, the adoption of the new levels not requiring the pressing of another button. The small face cannot depart from the icon. As depicted in FIG. 9, if the movement engendered by the buttons brings it into contact with the edge of the icon, it slides along the edge in the direction closest to that of the initial movement. In the example illustrated by FIG. 9, pressing the "←" button causes the face to slide on the edge of the icon, ascending towards the corner denoted "TF1".

In order to better demonstrate to the user that the audio signals originating from the two services are mixed, the surface of the adjustment icon exhibits a mix of two colours. The designer of the graphical interface chooses two very different colours to identify the two audio sources AS1 and AS2, for example red and green, the mix of these two colours generates an ochre colour. The surface inside the icon and in proximity to the corners is for example, red near the left corner representing AS1, and green near the right corner representing AS2. The colour of the intermediate surface between the two corners is a mix of the two colours. On moving away from the left (right) corner, the surface exhibits a gradation of red (respectively of green) tending towards ochre. All along and around the midline of the icon, the colour is uniformly ochre. This colour gradation indicates intuitively to the user that the audio signals originating from the two services are mixed. If the cursor is situated where the surface is redder, the sound level assigned to AS1 is greater than that given to AS2. If the cursor is situated where the surface is greener, it is AS2 which dominates.

Figure 10:
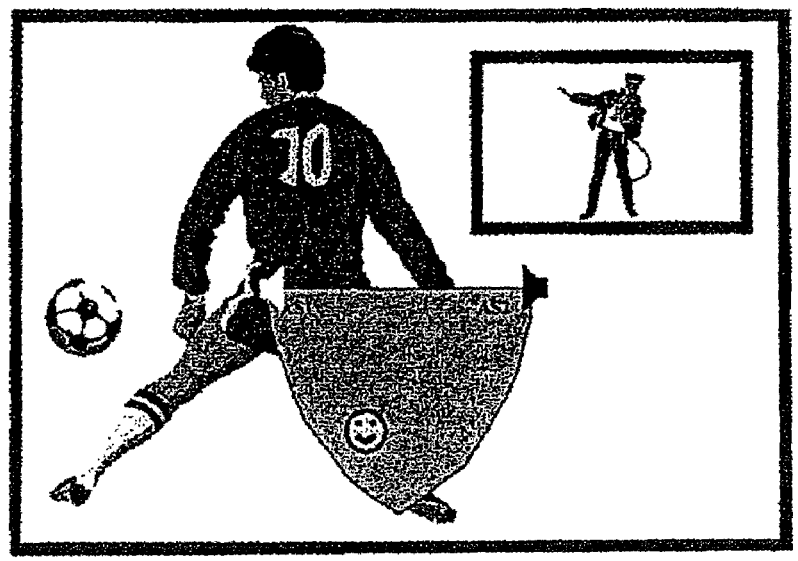
FIG. 10 depicts a screen view comprising the adjustment icon, in full screen mode: the image of a first audiovisual service, and, inlaid: the image of a second audiovisual service.
Figure 11:
FIG. 11 depicts a screen view comprising the adjustment icon when a single audiovisual service is selected.

According to an improvement, when the user activates the "PIP" command, the television receiver brings up in inset mode the image of the audiovisual service which is not selected. As depicted by FIG. 10, the image 10.1 broadcast by the second service selected appears inset in the upper right corner of the screen. The user can thus see the visual content of the second service selected and, if he deems it to be more interesting, exchange them by activating the "EXCH" command.

When a single audio source is selected, only a single sound parameter can be adjusted. The screen looks like FIG. 11. The adjustment icon is symbolized in the form of a straight vertical segment on which the small face is found. The movement of the small face is effected with the two buttons: ↑, ↓ whose function is then to increase and to decrease the sound of the single audio source. The other six buttons are inactive.

Among the numerous advantages of the present invention, the user can for example watch a sports match, and add a journalist's commentary broadcast on an audio service which he has selected to the sound of the match. This service can be a radio transmission present in the package of programmes that the user can receive on his decoder. In this case, the commentary on this sports match is transmitted simultaneously (such as the case for example with important football matches). The user can also add a musical component to accompany the showing of an audiovisual programme, for example a weather bulletin or television news. The user can also listen with a fairly high level to a musical broadcast and watch (with the aid of the PIP function) the television news inset, listening to it with a low sound level. In this way one can be informed of bad news with pleasant music! The user can exchange the two transmissions quickly if an event broadcast on the television news service seems to him to be important (with the EXCH button).

The user can watch an event having a monophonic audio component and replace this component with a stereophonic component linked to the event in question transmitted simultaneously on a service of another type, for example a radio channel, and of better quality. The user can then watch a film while enabling the subtitling so as to follow the dialogue of this film, and select the sound originating from another service. This makes it possible to watch a film without disturbing people who might be in the same room, who do not want to watch this film and who want to listen to the radio.

According to an improvement, the various values of the sound levels and the characteristics of the audio sources (the identifiers in particular) are written to a nonvolatile memory. In this way, on power-up, the decoder reads from this memory and sets the adjustments into the same configuration as they were in during power-down.

The embodiment described above relates to the selecting of two audio or audiovisual services. However, the present invention can perfectly well allow the adjustment of the levels of the audio signals originating from three services. In the case of three services with audio components AS1, AS2 and AS3, and according to a first embodiment, three adjustment icons appear successively on the screen, the first makes it possible to adjust the levels of AS1 and AS2, the second of AS2 and AS3, and the third of AS3 and AS1. For each of these icons, the direction and control buttons have the same manner of operation as what was described earlier. The remote control then has two buttons making it possible to go from one icon to the other in the direction: AS1-AS2, then AS2-AS3, then AS3-AS1; or in the opposite direction: AS1-AS3, then AS3-AS2, then AS2-AS1. According to another embodiment, the adjustment icon exhibits a three-dimensional appearance on the screen. Additional direction buttons make it possible to move the cursor around in a three-dimensional space. The generalization beyond three services is of little interest, especially from an auditory standpoint, and turns out to be very difficult to achieve from the graphical standpoint.

The graphical adjustment device can also be used for adjustments other than that of the sound emitted by audio sources. For example, the device can be used to adjust the power levels of several light sources in a room. The adjustment icon then appears on the control screen of a home-automation installation. These light sources may be of different colours, and in a particularly advantageous manner, these colours are those of the various corners of the adjustment icon. However, in a home-automation environment, another example is a shower hot water (red colour source) cold water (blue colour source) adjustment. The graphical adjustment device can thus be used to explain the operation of a shower theromstatic mixer valve. The two direction buttons ←, → allow the adjustment performed by the temperature knob (generally the one on the right). The ↑, ↓ buttons allow flow rate adjustment (generally the one on the left).

It should be obvious to those skilled in the art that the present invention allows embodiments under numerous other specific forms without departing from the invention's field of application as claimed. In particular, the invention applies to all audiovisual transmissions originating from a broadcasting network, this network broadcasting analogue or digital data.

The invention claimed is:

1. Method of adjustment in an audiovisual receiver of levels of sound signals originating from a plurality of sources, comprising:

a step of selecting at least two audio or audiovisual sources, a step of displaying on a screen an icon comprising at least two points representing the two sources and a cursor, a step of mixing the sound signals while assigning the sound signals a specified sound level, wherein the step of mixing comprises a step of adjusting the sound levels independently for each source by moving the cursor along at least two dimensions, the distance between the cursor and the point representing a source being proportional to the sound level assigned to this source, the cursor moving within the icon such that the cursor and the at least two points representing the two sources remain displayed together on the screen.

2. Method of adjustment according to claim 1, comprising a step of moving the cursor along the direction specified by a user command.

3. Method of adjustment according to claim 2, wherein the movement of the cursor along the direction specified by a user command is performed in the icon delimited by at least one line, and if the cursor encounters the line, the step of movement continues by moving the cursor along the line in the direction closest to that specified.

4. Method of adjustment according to claim 1 comprising a step of selecting a third source, wherein the icon exhibits a three-dimensional appearance on the screen, the cursor appearing to move in the space delimited by this icon.

5. Method of adjustment according to claim 1 comprising a step of selecting a third source, wherein the icon exhibits a three dimensional appearance on the screen, the cursor appearing to move in the space delimited by this icon.

6. Audiovisual receiver comprising:

a means of receiving at least two audiovisual sources, a means of transmitting the audiovisual signals received, a means of selecting audio or audiovisual sources, a circuit for mixing the audio signals from the at least two audiovisual sources, a means of displaying an icon comprising at least two points representing the two sources and a cursor, and a means of entering user commands to move the cursor along at least two dimensions, the distance between the cursor and a point representing a source being proportional to the sound level assigned to this source, the cursor moving within the icon such that the cursor and the at least two points representing the two sources remain displayed together on the screen.

7. Audiovisual receiver according to claim 6, wherein the icon displayed constitutes a surface which is delimited by straight or curved lines and within which the cursor travels according to the user commands.

8. Audiovisual receiver according to claim 6 wherein the icon displayed by the display means represents a surface whose outline comprises at least two curved lines having as focus the points representing the two sources.

9. Audiovisual receiver according to claim 6. wherein the surface of the icon Is colored by at least two colors, each of the colors lying in immediate proximity to one of the corners which correspond to sources, wherein the surface between two corners is colored with a color obtained through a mix of the two colors of the two corners, the mix exhibiting a color gradation moving away from the corners.

10. Audiovisual receiver according to claim 6, wherein the names or the symbols of the sources are displayed in immediate proximity to the points representing the two sources.

11. Audiovisual receiver according to claim 6, wherein the icon displayed by the display means exhibits a three-dimensional appearance to represent the sound levels assigned to three sources, the cursor appearing to move in the space delimited by this icon.

12. Audiovisual receiver according to claim 6, wherein it comprises a means of entering a user command for the displaying a new representation of the icon exhibiting sound levels associated with a third source and with at least one of the first and second sources.

13. Method of adjustment according to claim 3 comprising a step of selecting a third source, wherein the icon exhibits a three-dimensional appearance on the screen, the cursor appearing to move in the space delimited by this icon.

14. Method of adjustment according to claim 1 comprising a step of selecting a third source, wherein the icon displayed exhibits the sound levels applied to the first and second sources, and comprising a step of formulating a new pair of levels which is triggered by a user command, and a step of displaying the icon exhibiting new sound levels associated with the third source and with at least one of the first and second sources.

15. Method of adjustment according to claim 2 comprising a step of selecting a third source, wherein the icon displayed exhibits the sound levels applied to the first and second sources, and comprising a step of formulating a new pair of levels which is triggered by a user command, and a step of displaying the icon exhibiting new sound levels associated with the third source and with at least one of the first and second sources.

16. Method of adjustment according to claim 3 comprising a step of selecting a third source, wherein the icon displayed exhibits the sound levels applied to the first and second sources, and comprising a step of formulating a new pair of levels which is triggered by a user command, and a step of displaying the icon exhibiting new sound levels associated with the third source and with at least one of the first and second sources.

* * * * *